United States Patent [19]

Ballif, III et al.

[11] 4,223,064
[45] Sep. 16, 1980

[54] ALKALI METAL PROTECTIVE GARMENT AND COMPOSITE MATERIAL

[75] Inventors: John L. Ballif, III, Salt Lake City, Utah; Wei W. Yuan, Seattle, Wash.

[73] Assignee: The United States of America as represented by the United States Department of Energy, Washington, D.C.

[21] Appl. No.: 37,971

[22] Filed: May 10, 1979

[51] Int. Cl.² .................. B32B 15/04; B32B 17/02
[52] U.S. Cl. .................................... 428/246; 2/2;
2/2.5; 2/81; 428/263; 428/335; 428/428;
428/433; 428/920
[58] Field of Search ...................... 2/2 R, 81, 7, 8;
428/234, 235, 263, 268, 332, 428, 433, 457, 920, 246, 335

[56] References Cited

U.S. PATENT DOCUMENTS

| 2,561,891 | 7/1951 | Tucker | 2/81 UX |
| 2,627,072 | 2/1953 | Frommelt et al. | 2/81 |
| 3,413,180 | 11/1968 | Smith | 428/246 |
| 3,522,074 | 7/1970 | Kalleberg et al. | 428/263 |
| 3,819,468 | 6/1974 | Sauder et al. | 428/920 |

Primary Examiner—William J. Van Balen
Attorney, Agent, or Firm—R. V. Lupo; Richard E. Constant

[57] ABSTRACT

A protective garment and composite material providing satisfactory heat resistance and physical protection for articles and personnel exposed to hot molten alkali metals, such as sodium. Physical protection is provided by a continuous layer of nickel foil. Heat resistance is provided by an underlying backing layer of thermal insulation. Overlying outer layers of fireproof woven ceramic fibers are used to protect the foil during storage and handling.

6 Claims, 2 Drawing Figures

ALKALI METAL PROTECTIVE GARMENT AND COMPOSITE MATERIAL

BACKGROUND OF THE INVENTION

This disclosure relates to a protective composite material developed to resist damage or injury due to exposure to hot alkali metals, such as molten sodium. The material was specifically developed for incorporation in garments for the protection of personnel during emergency operations and rescue efforts in the vicinity of liquid-metal cooled reactors.

Typical design criteria for such a protective garment are as follows:

a. the garment must be impervious to burning alkali metals when subjected to a three second spray at a 1,000° F. alkali metal bulk temperature;

b. the outer surface of the garment should be wrinkle free;

c. the garment must be capable of being put on the user with assistance in less than one minute and should be removable without assistance immediately if required;

d. the garment must permit the wearer to perform simple tasks, such as operating hand fire extinguishers, turning valve operators, climbing ladders, and rescue operation;

e. the maximum inside surface temperature of the garment should not exceed 160° F. after two minutes of alkali metal burning on the surface of the suit.

The above criteria are met by a laminated composite material basically comprising an outer layer of continuous nickel foil and an inner layer of thermal insulation. The layer of nickel foil resists penetration of the molten alkali metal, while the underlying layer of thermal insulation provides the required resistance to heat transfer. This material can be adapted to various forms of protective articles for personnel or equipment, and is specifically adaptable to the construction of coats, trousers, hoods, mittens and boots to completely envelop the body of a person exposed to an environment including a possible spray of molten or burning alkali metal.

DESCRIPTION OF THE PREFERRED EMBODIMENT

Figure 2:
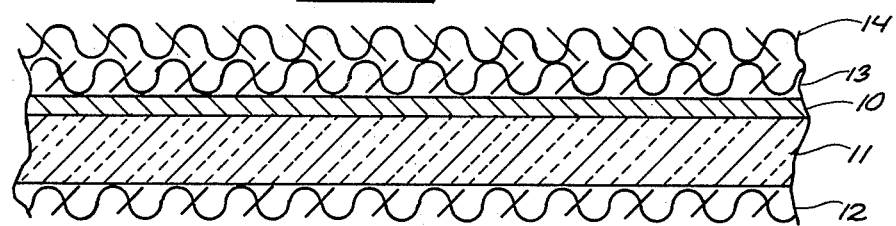
FIG. 2 is an enlarged fragmentary cross-sectional view taken through the composite material.

FIG. 2 illustrates the details of the composite material developed to meet the above design criteria in providing protection for personnel or articles during emergency opertions and rescue efforts in the vicinity of liquid-metal cooled reactors.

A cross section of the material comprises a layer of nickel foil 10 backed by a layer of thermal insulation 11. These two layers provide the essential operational characteristics of the material and garments made from it. The main protection provided against penetration by molten alkali metals, such as sodium, is a continuous layer of nickel foil on the order of one or two mils thick. In order to provide adequate flexibility for use of the nickel foil layer in garments, it is preferred that the foil be fully annealed. Using nickel foil that is not fully annealed risks subsequent damage to the integrity of the foil layer due to subsequent mechanical working or failure.

In order to facilitate handling of the nickel foil 10 during production of garments, it is preferably sandwiched between two layers of woven ceramic fibers, such as a woven glass fiber fabric. A silicon binder can be used to secure the foil layer between the two light layers of fibrous materials. This initial sandwiching of the foil permits it to be handled by persons constructing the garment without undue risk of injury by cutting themselves on the edges of the foil. It also reinforces the foil and assists in preventing accidental puncture or tearing of the foil itself during handling.

The layer of thermal insulation underlying the foil might comprise any material capable of resisting heat transfer under the above designed criteria. One example of a specific material meeting such criteria with minimum thickness is a blanket of alumina insulation known as "Saffil" alumina insulation, available from Imperial Chemical Industries, Wilmington, Del. In order to maintain the integrity of a working garment and to provide a comfortable inner lining to the material, the inside surface of the layer of thermal insulation 11 is covered by a fire resistant fabric 12. Such fabrics are common in other forms of fire resistant garments.

The layer of nickel foil 10 is covered by an overlying outer shell in the form of two layers of woven ceramic fiber fabric, such as a glass fiber fabric. These layers are designated in the drawings by the reference numerals 13 and 14. The outer shell of the composite material is a sacrificial cover which protects foil 10 from penetration during handling. The two outer layers are mechanically joined to the layer of foil 10 by fasteners such as staples or rivets, or by using glue to tack them in place. They should prefereably be readily removable for replacement when necessary. Two layers of woven fabric 13, 14 are used, with the outer layer 14 generally protecting the inner layer 13 from damage.

For further protection, the outer layer of woven ceramic fiber fabric 14 may be coated with a material resistant to the alkali metal. As an example, a ceramic coating or adhesive may be used to cover the outer surface of the layer 14. However, this tends to stiffen the material and might detract from the flexibility required in a practical garment.

The layer of thermal insulation 11 and the layers of woven ceramic fibers 13, 14 are joined or fastened to the intermediate layer of nickel foil 10 by any suitable mechanical system capable of insuring complete integrity of the various layers which overlie one another so as to completely cover the surfaces of the foil. They may be stitched, tacked, stapled, riveted or otherwise fixed to one another as desired in a particular application of the material. Any materials used in such joinder must be capable of withstanding both the heat and alkali metals to which they might be subjected.

Figure 1:
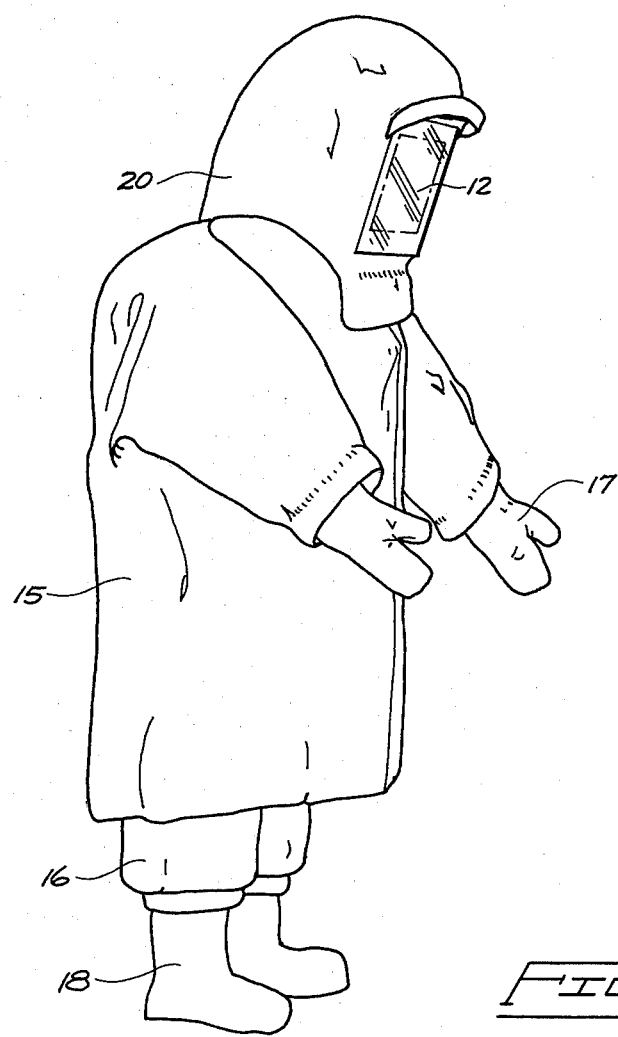
FIG. 1 is an illustrative drawing of a protective suit incorporating the garments described herein.

FIG. 1 generally illustrates a protective suit comprised of garments that can be fabricated from the composite material shown in FIG. 2. The suit includes a covering coat 15, trousers 16, and a hood 17. The coat 15 overlaps trousers 16. Coat 15 provides a basic protection from overhead sprays, while trousers 16 provide protection from below when climbing a ladder or working on exposed platforms. Simple mittens 17 protect the hands of the user and provide adequate flexibility for simple manipulations. Boots 18 comprise conventional firemen's boots having a protective covering of the nickel foil 10 and layer of thermal insulation 11 only.

The hood 20 is enlarged to provide room for a conventional self-contained breathing apparatus, and includes a view window 21 of wire reinforced glass or equivalent materials.

A protective suit including the garments shown in FIG. 1 was tested experimentally by exposing it to a spray of molten sodium at a temperature of 1,000° F. for three seconds under 40 psig pressure at a distance of 15". The sodium burning time was between 20 and 40 seconds. The temperature at the inside surface of the garment materials was monitored continuously during the test. At the time of the test, the ambient temperature was 34° F. and the relative humidity was 78%. Following its completion, the garment materials were visually inspected.

No gross deterioration of the outer layer was noticed. All the sodium was retained on the outer shell comprising layers 13 and 14. Some portions of the outer layer 14 became brittle but no indication of sodium penetration was found. The interior was in excellent shape and the inner surface temperatures were in the range of 70° to 127° F., well below the 160° F. design maximum temperature for the garments. The garments were flexible after the test and the covered boots were intact.

Deterioration of the outer layer 14 did take place when sodium was allowed to remain on its surface for more than a few hours. Water in the air combined to form caustic, which reacted with the glass fibers and caused this layer to become brittle. This can be overcome by chemically removing the sodium from the outer surface after use of the garments.

Having described our invention, we claim:

1. A heat resistant material adapted to be incorporated in protective articles exposed to a spray of molten alkali metal, comprising:
   a continuous outer layer of nickel foil;
   a continuous layer of woven ceramic fiber fabric completely overlying a first surface of the layer of nickel foil;
   and a continuous layer of thermal insulation completely underlying a second surface of the layer of nickel foil; and means securing the underlying and overlying layers to the layer of nickel foil.

2. The material as set out in claim 1 wherein the layer of nickel foil is fully annealed.

3. The material as set out in claim 1 wherein the nickel foil is fully annealed and has a thickness on the order of one or two mils.

4. The material as set out in claim 1 wherein the nickel foil is additionally sandwiched between two continuous light layers of woven ceramic fiber fabric bonded to opposite surfaces of the layer of nickel foil.

5. The material as set out in claim 1, further comprising:
   a second layer of woven ceramic fiber fabric completely overlying the first surface of the layer of nickel foil;
   and means securing the second layer of woven ceramic fiber fabric to the layer of nickel foil.

6. A heat resistant garment for protection of individuals exposed to a spray of molten alkali metal, such as sodium, comprising:
   a covering element adapted to envelop at least a portion of a human body;
   said element being formed from a continuous layer of nickel foil wherein the layer of nickel foil is fully annealed and has a thickness on the order of one or two mils, the layer of nickel foil presenting an inner surface adapted to face toward the body of one wearing the garment and an opposed outer surface;
   said garment further comprising:
   a continuous layer of thermal insulation completely underlying the inner surface of the layer of nickel foil;
   first and second layers of woven ceramic fiber fabric completely overlying the outer surface of the layer of nickel foil;
   and means joining both the layer of thermal insulation and the layers of woven ceramic fiber fabric to the layer of nickel foil.

* * * * *